(12) United States Patent
Lordahl et al.

(10) Patent No.: US 7,165,570 B1
(45) Date of Patent: Jan. 23, 2007

(54) PRESSURE BALANCING CARTRIDGE FOR MIXING VALVE

(75) Inventors: Var Lordahl, 1571 Schaeffer Rd., Long Grove, IL (US) 60047; Scott H. Koepsel, Winthrop Harbor, IL (US)

(73) Assignee: Var Lordahl, Long Grove, IL (US)

( * ) Notice: Subject to any disclaimer, the term of this patent is extended or adjusted under 35 U.S.C. 154(b) by 190 days.

(21) Appl. No.: 10/722,628

(22) Filed: Nov. 28, 2003

(51) Int. Cl.
*G05D 11/16* (2006.01)
*F16K 11/07* (2006.01)

(52) U.S. Cl. ............... 137/98; 137/454.6; 137/625.17
(58) Field of Classification Search ............. 137/98, 137/100, 454.6, 625.17, 625.41
See application file for complete search history.

(56) References Cited

U.S. PATENT DOCUMENTS

| | | | | |
|---|---|---|---|---|
| 1,508,938 A | * | 9/1924 | Powers et al. ............... | 137/88 |
| 3,675,682 A | * | 7/1972 | Lyon ..................... | 137/625.17 |
| 4,305,419 A | * | 12/1981 | Moen ..................... | 137/454.6 |
| 4,417,602 A | * | 11/1983 | Moen ..................... | 137/625.17 |
| 4,469,121 A | * | 9/1984 | Moen ..................... | 137/100 |
| 4,473,088 A | * | 9/1984 | Dotter ..................... | 137/98 |
| 4,827,966 A | * | 5/1989 | Takano et al. ............. | 137/100 |
| 5,732,729 A | * | 3/1998 | Shieh ..................... | 137/100 |
| 6,237,635 B1 | * | 5/2001 | Nambu ................... | 137/625.69 |
| 6,427,713 B1 | * | 8/2002 | Dempsey et al. ........... | 137/98 |

* cited by examiner

*Primary Examiner*—Stephen M. Hepperle
(74) *Attorney, Agent, or Firm*—Kajane McManus

(57) ABSTRACT

A pressure balancing cartridge for mixing hot and cold water includes a casing having a sleeve therein which further includes a reciprocating balancing spool therein. There are seal members positioned to form a seal between the sleeve and the casing. Further, a spring is incorporated to protect a balancing spool of the valve from "water hammer" shock and to mechanically shear and digest any deposited matter in the area of the spring. Still further, by using material other than stainless steel, failure of the balancing spool is eliminated in "bad" water environments.

Finally, the seal members comprise stainless steel clips or inserts. To address issues of mechanical wear, all improvements defined above increase useful longevity of the cartridge.

2 Claims, 3 Drawing Sheets

PRESSURE BALANCING CARTRIDGE FOR MIXING VALVE

BACKGROUND OF THE INVENTION

1. Field of the Invention

The present invention relates to a pressure balancing cartridge for a mixing valve, which is used in showers and the like for mixing hot and cold water, maintaining the desired mixture even when water is used at another location on the water supply line, such as when a toilet is flushed, commonly referred to in the industry as an anti-scald mixing valve. More specifically, the cartridge of the present invention is made of a casing, an upper stem, a lower stem assembly and a balancing spool within the lower stem assembly both made of the suitable inexpensive material, creating a balancing spool which will not "seize up" or fail in bad water environments and which is protected from damage by "water hammer" shock by a shock absorbing spring, with the spring also helping to clear deposits from within the cartridge.

2. Prior Art

Heretofore, an original equipment manufacturer (OEM) model has been very expensive, because it is typically created from stainless steel, increasing product and production costs, and which does not always last very long under certain water conditions. Also, because most of the sales distribution is accomplished through specialty repackagers—i.e., people who package with their name on the product and market thousands of parts, marketing expense is also increased. Further, expenses such as catalog distribution, art work, packaging and trade shows, and sales commissions add to the final sales price. If the sale price of the repair part becomes too high, after mark up, the part often nearly costs as much as an entire new faucet.

Presently, the OEM makes the lower stem assembly of stainless steel, the purported benefits of which are intended to be durability, mainly in three areas, the seal surface areas of the O.D. of the lower stem assembly, the I.D. surface of the lower stem assembly, and the top edge of the balancing spool.

Thus, historically, spool activated pressure balancing valves have the following problems:

1. Too expensive to manufacture due to the need for machined stainless steel construction so as to eliminate spool degradation caused by peening of the end which comes into contact with a metal stem.

2. Operational defaults necessitating cartridge replacements due to the "seizing up" of the spool caused by sticking and/or jamming brought about by mineral particulate build up and aqueous debris in the water supply.

The cartridge proposed herein eliminates these problems by:

1. Integrating a shock absorbing interactive spring installed onto a top end of this spool which acts as an interface between the comparatively soft plastic spool end and a comparatively hard brass stem of the cartridge.

2. This shock absorbing feature allows the spool to be manufactured both inexpensively and with equal importance, of an ultra high temperature highly lubricitous plastic such as a PTFE compound. This type of material naturally sticks to virtually nothing, especially as compared to stainless steel.

3. This spring, during normal spool operation, performs both as a shock absorber and a mechanical device which cleans off any potential accumulated buildup by its inherent shearing action as it compresses around and over the end of the spool. Additionally this spring proactively eliminates spool seizure caused by mineral particulates and aqueous debris build up within the lower stem/spool chamber. It does so by mechanically digesting these mineral particulates and pieces of aqueous debris, reducing them down to smaller sizes that will flow freely out of the valve before they have a chance to cause a seizure default.

As will be described in greater detail hereinafter, the cartridge of the present invention overcomes these disadvantages as well as others never heretofore addressed.

SUMMARY OF THE INVENTION

According to the invention there is provided a pressure balancing cartridge for use in a mixing valve which eliminates substantially all of the expensive manufacturing aspects of the O.E.M. product while retaining seal surface durability via stainless steel clips attached to the cartridge at predetermined points and provides a balancing spool which incorporates a shock absorbing spring installed on top of the spool making the spool resistant to damage caused by the shock of "water hammer" and eliminates failure caused by seizure. This is accomplished by creating the lower stem and spool of a high temperature slippery resins or plastics used in manufacturing and further increasing the useful life of the spool by incorporation of the spool biasing spring.

These goals are accomplished by replacing the stainless steel lower stem with an very high temperature super slippery (highly lubricitous) plastic or resin and by covering the critical seal surfaces with stainless steel clips (nowhere else needed) then centerless grinding same for a very precise fit; replacing the stainless steel balancing spool with a spool made of an ultra high temperature super slippery plastic or resin, such as a PTFE compound, centerless grinding same for a very precise fit and then protecting its top end from "water hammer" shock by provision a biasing spring shock absorber, with the spring also shearing away any contaminant depositions in the area thereof.

DESCRIPTION OF THE PREFERRED EMBODIMENT

Figure 1:
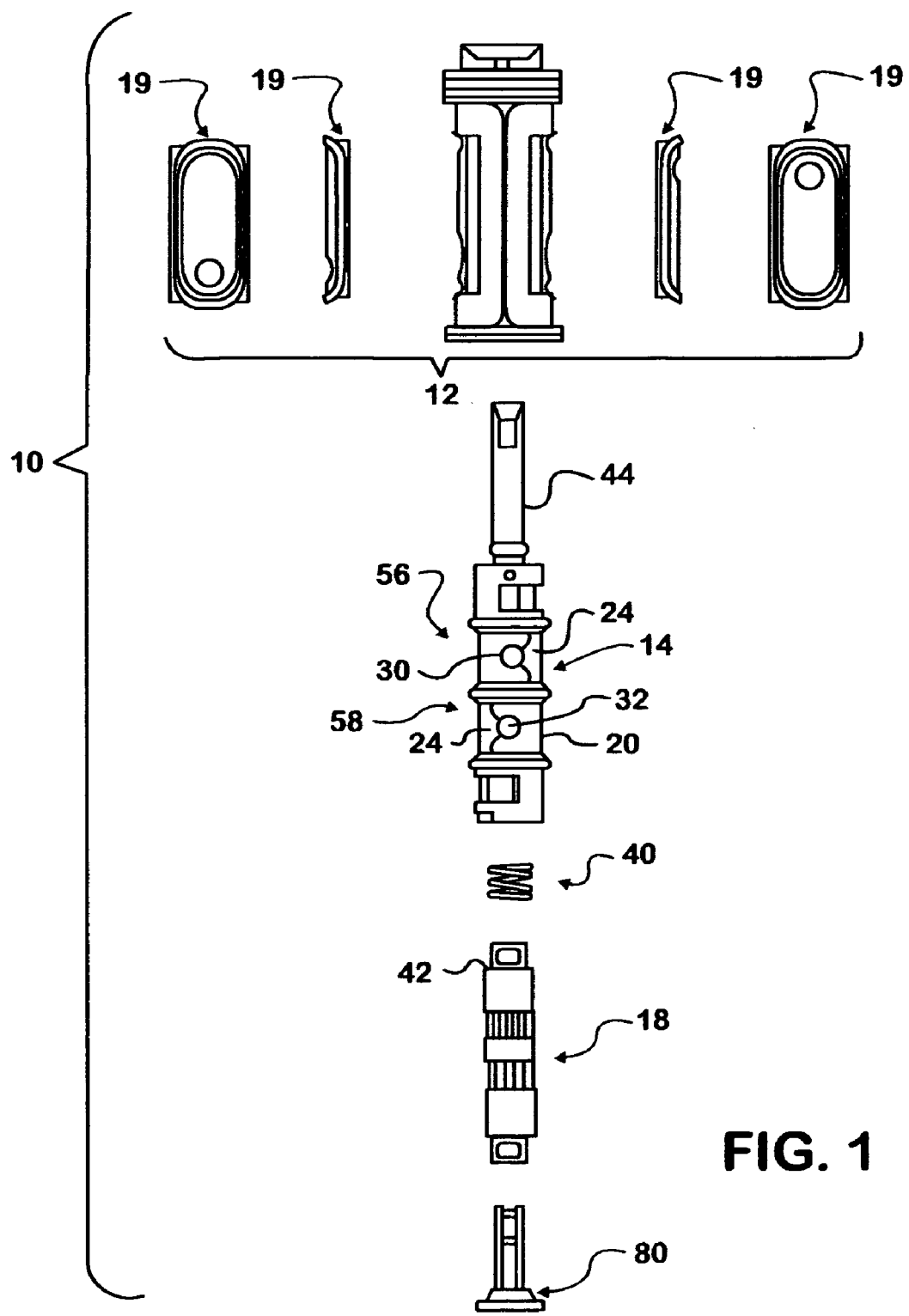
FIG. 1 is an exploded perspective view of the pressure balancing cartridge of the present invention.

According to the invention there is provided a pressure balancing cartridge constructed differently than the OEM both in material and functionality, the combination of which improves the durability and function of the cartridge while at the same time reduces cost so significantly that, unlike the OEM, it fits well into conventional parts distributor sales structures.

These goals are accomplished by:

1. Replacing the entire OEM design one piece outer stainless steel portion of the lower stem assembly with one constructed of multiple pieces, one molded from ultra lubricitous very high temperature plastic resins plus two clips or inserts constructed of inexpensive stainless steel which provide seal surfaces equal in quality and durability to the OEM for the critical seal areas at greatly reduced costs.

2. Replacing the entire OEM design one piece inner spool with one constructed of at least two pieces, one molded from ultra lubricitous very high temperature plastic resins such as a PTFE compound plus an integrated shock absorbing interactive spring installed onto one end of this spool which acts as an interface between the plastic spool and the upper stem, thereby providing extra long life and trouble free non seizing functionality to the cartridge.

A substantially similar present day mixing valve is described in U.S. Pat. No. 4,469,121, the basic teachings of which are incorporated herein by reference, to limit redundancy.

The present application illustrates an improved embodiment of a pressure balancing cartridge for such mixing valve. Basically, such mixing valve incorporates the pressure balancing cartridge which is seated within a valve housing, a generally spherically shaped chamber. A volume control member, when present, is generally coaxially arranged with the pressure balancing cartridge and is normally positioned within the valve housing.

In the preferred embodiment illustrated herein, the pressure balancing cartridge 10 incorporates a casing housing 12, which is created from a suitable resin or plastic. The casing 12 includes therein a pressure balancing device 13 which comprises a sleeve or lower stem 14 within which a reciprocating balancing spool 18 is movably received. The casing 12 also incorporates side seals 19 for ensuring a water tight seal against a housing of a mixing valve (not shown)

The sleeve 14 and balancing spool 18 have heretofore been machined from stainless steel, making the cartridge 10 very expensive.

Further, as stated above, drawbacks to longevity of such stainless steel embodiment exist.

First, in areas where bad or hard water is present, sticking of the balancing spool 18 due to deposition of contaminants in the water takes place, requiring early replacement of the cartridge 10.

Second, the balancing spool 18, has been damaged by "water shock" because its movement within the sleeve 14 has been unrestricted.

Third, because the valve 10 components have all been made of stainless steel, the cost for replacement of the valve 10 has been prohibitive.

To overcome these and other drawbacks, it has been proposed to modify the present embodiment in the manner to be described in further detail hereinbelow.

First, it is proposed to mold the sleeve 14 and balancing spool 18 of a very high temperature highly lubricitous plastic or resin such as a PTFE compound, which eliminates seizing of the parts in hard or bad water environments.

Because there exist areas on an outer surface 20 of the sleeve 14 where a sealing surface must be assured to exist, stainless steel clips 24 have been fabricated which cover the seal surfaces, the clips 24 having nibs 26 thereon which engage in diametrically opposed pairs of upper and lower ports 30 and 32 respectively in the sleeve 14.

Next, it is proposed to position a biasing spring 40 between an upper end 42 of the balancing spool 18, as shown in the Figures, and a upper stem 44 of the cartridge 10 which engages within the sleeve 14, in known fashion shown, with the spring 40 biasing the balancing spool 18 downwardly, virtually eliminating damage from "water hammer" effect since the spring 40 keeps the balancing spool 18 from slamming against an end 50 of the stem 44 adjacent the top surface 42 thereof.

Figure 2:
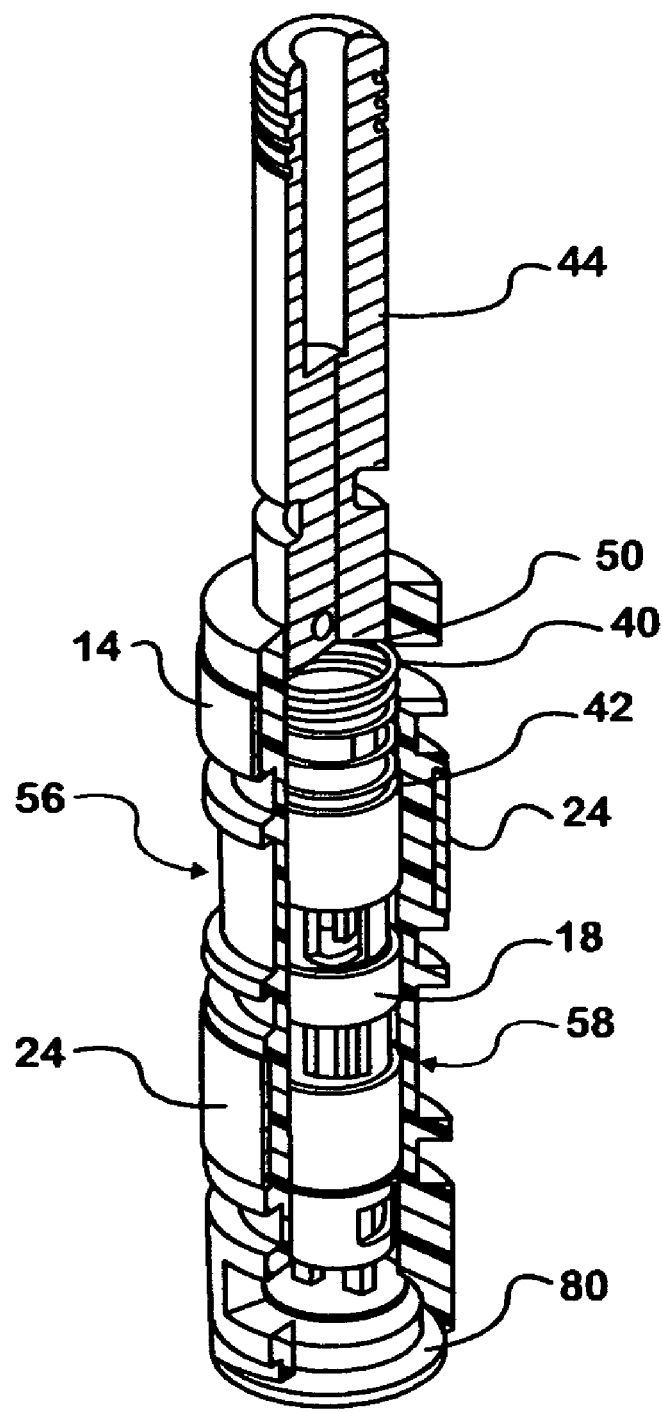
FIG. 2 is a longitudinal cross sectional view through the cartridge of FIG. 1.
Figure 3:
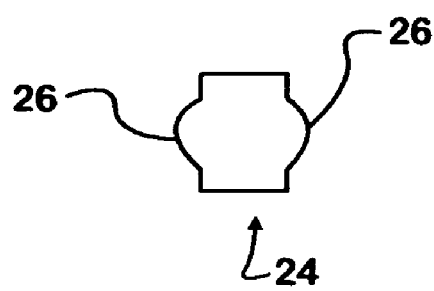
FIG. 3 is a perspective view of a stainless steel clip of the cartridge.
Figure 4:
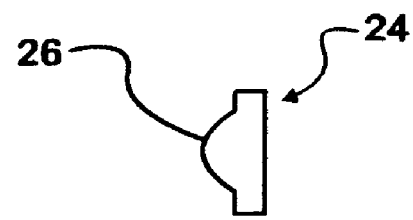
FIG. 4 shows the clip of FIG. 3 in its arcuate orientation.
Figure 5:
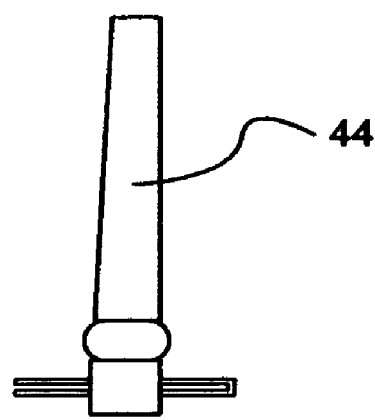
FIG. 5 is a perspective view of an upper stem of the cartridge.

In the construction illustrated in FIG. 2, the casing 12 has been eliminated and a portion of the sleeve 14 has been cut away to allow viewing of the components received therein.

First it will be seen that the spring 40 has been incorporated into the sleeve 14 adjacent the end 42 of the balancing spool 18 closest to the upper stem 44. This spring 40 has been found to protect the movable spool against "water hammer" effect; i.e., it does not allow the spool 18 be slammed against stem 44, by water rushing in when the cartridge 10 is in an open position thereof or by significant fluctuation of incoming pressure balance. This has been found to substantially increase the longevity of the spool.

The spring 40 further acts as a mechanical device which cleans off any potential accumulated buildup by its inherent shearing action as it compresses around and over the end of the spool 18. Additionally this spring 40 proactively eliminates spool 18 seizure caused by mineral particulates and aqueous debris build up within the lower stem/sleeve 14. It does so by mechanically digesting these mineral particulates and pieces of aqueous debris, reducing them down to smaller sizes that will flow freely out of the cartridge 10 before they have a chance to cause a seizure default.

Further, it must be understood that the stainless steel from which the sleeve 14 and spool 18 have heretofore been created, has now been replaced by use of an very high temperature lubricated resin or plastic.

Because the sleeve 14 is now created of resin or plastic, it has been found that certain areas thereof rub against an interior of the casing 12, creating wear thereon.

To reduce, if not altogether eliminate such wear, it is proposed to provide small stainless steel surface clips or inserts 24 each of which is positioned diametrically opposite the other, with one being positioned at a cold water inlet area 56 and the other being positioned at the hot water inlet area 58, respectively.

Empirical testing has shown that wear in these areas is eliminated by provision of such clips 24.

It will be understood that structures within the casing 12 are maintained therein by provision of an end cap 80.

Operation of the valve 10 is not modified by the proposed changes to the structure thereof.

Through empirical testing, it has been found that these modifications increase useful longevity of the pressure balancing cartridge 10 significantly and dramatically cut cost associated with replacement of such pressure balancing cartridge 10.

Whereas the preferred form of the invention has been shown and described herein, it should be realized that there may be proposed many modifications, substitutions and alterations thereto.

We claim:

1. A pressure balancing cartridge for use in an anti-scald hot and cold water mixing valve, and the pressure balancing cartridge comprising a casing, a sleeve within the casing, and a reciprocating balancing spool within the sleeve, the improvement comprising:

the sleeve and spool being molded of a very high temperature ultra lubricated plastic resin to prevent thermal malformation thereof due to prolonged contact with hot water, and to prevent the build up of mineral deposits and debris commonly found in aqueous solution in water supplies, within the mixing valve, and the sleeve incorporating a pair of surface seal inserts, each of which is positioned diametrically opposite the other, with one being positioned at a cold water inlet area and the other being positioned at a hot water inlet area.

2. The cartridge of claim 1 wherein the plastic resin is a PTFE compound.

* * * * *